Figure 1:
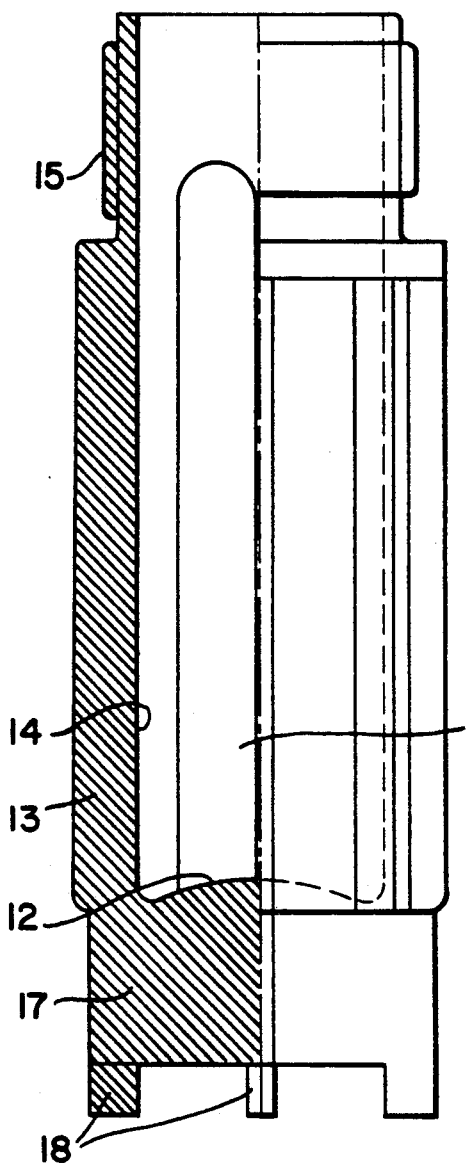

US005253761A

United States Patent [19]

Faber

[11] Patent Number: 5,253,761
[45] Date of Patent: Oct. 19, 1993

[54] RESERVOIR FOR CAPSULE FOR ORAL ADMINISTRATION

[75] Inventor: Mathijs Faber, Schagen, Netherlands

[73] Assignee: Mallinckrodt Medical, Inc., St. Louis, Mo.

[21] Appl. No.: 646,627

[22] PCT Filed: Jul. 28, 1989

[86] PCT No.: PCT/US89/03272

§ 371 Date: Mar. 5, 1991

§ 102(e) Date: Mar. 5, 1991

[30] Foreign Application Priority Data

Aug. 4, 1988 [NL] Netherlands ............... 88011947

[51] Int. Cl.$^5$ .......................................... B61D 43/10
[52] U.S. Cl. ................................... 206/530; 206/540; 206/583; 220/737; 220/671
[58] Field of Search ............... 206/583, 524, 528, 37, 206/416, 530, 540; 220/737, 671, 408

[56] References Cited

U.S. PATENT DOCUMENTS

| 2,551,710 | 5/1951 | Slaughter | 206/446 |
| 2,868,411 | 1/1959 | Kesselman | 220/737 |
| 2,915,640 | 12/1959 | Grubel et al. | 206/446 |
| 3,256,441 | 6/1966 | Grasty | 206/446 |
| 3,941,237 | 3/1976 | MacGregor, Jr. | 220/737 |
| 4,040,536 | 8/1977 | Schwarz | 206/530 |
| 4,613,042 | 9/1986 | Aeschliman | 206/443 |
| 4,756,407 | 7/1988 | Larsen | 206/37 |
| 5,014,868 | 5/1991 | Wittig et al. | 220/737 |

FOREIGN PATENT DOCUMENTS 319421 1/1970 Sweden ............... 206/583

Primary Examiner—Joseph Man-Fu Moy
Attorney, Agent, or Firm—Brian K. Stierwalt

[57] ABSTRACT

The invention relates to a reservoir for at least one capsule for oral administration which comprises a substance which is dangerous for the environment, in particular a radioactive composition, which reservoir can be enclosed within an at least substantially cylindrical shielding sleeve, has a closed bottom and can be closed at its open upper end by means of a cap, the reservoir internally comprising a plurality of longitudinal ribs. The reservoir is preferably constructed so that it is locked against rotation within the shielding sleeve. The invention further relates to a shielded holder comprising the last-mentioned locked reservoir and a shielding sleeve having a bottom portion with an internal cross-section which is triangular to dodecagonal or forms a segment of a circle.

11 Claims, 2 Drawing Sheets

RESERVOIR FOR CAPSULE FOR ORAL ADMINISTRATION

The invention relates to a reservoir for at least one capsule for oral administration which capsule comprises a substance which is dangerous for the environment, in particular a radioactive composition. It is often desirable to administer a substance which is dangerous for the environment orally to a patient. Such a substance is usually dissolved and given the patient to drink. It will be obvious that such an administration is not very comfortable for the patient and moreover is not safe for him/herself and for his/her environment. In fact, the risk of spilling the solution given to drink is great. It is therefore common practice to administer such dangerous substances in the form of capsules, in which the capsule wall, which is preferably manufactured from gelatin, dissolves in the stomach and releases the substance. A well-known example of such a dangerous substance for oral administration, namely a radioactive substance, is radioactive iodine, in particular iodine-131. This radioactive iodine is administered, for example, as sodium iodide, in a suitable capsule, e.g. a gelatin capsule, to a patient, either as a diagnostic, namely to provide information on the functioning of the thyroid gland, or as a therapeutic, namely to control thyroid gland tumours.

The invention relates more in particular to a reservoir for at least one capsule with dangerous substance for oral administration, which reservoir can be enclosed within an at least substantially cylindrical shielding sleeve, has a closed bottom and at its open upper end can be closed by means of a cap, for example, a screw cap, or a cap having a bayonet catch or the like. Such a reservoir having a capsule which comprises a I-131-containing composition is placed available while enclosed in a lead shielding sleeve, the idea of this is that the patient opens the shielding sleeve, unscrews the cap from the reservoir, lets the capsule from the reservoir slide into his mouth and finally swallows the capsule with some water. In practice a cylindrical glass vial is used as a reservoir.

It has been found that the capsule, although dry and accommodated in the reservoir with a sufficient amount of "play", often "sticks" in the vial when the opened vial is turned upside down to let the capsule slide into the mouth. This problem presents itself in particular for capsules which comprise radioactive compositions, for example. iodine-131 compositions. The patient then has to try to get the capsule out of the reservoir yet by shaking the inverted reservoir or by using an instrument, for example, tweezers. A particularly inconvenient situation and moreover unsafe, especially due to the extra long time in which the environment of the patient is exposed to the dangerous substances, in particular the radioactive radiation which is released from the capsule. It has further been found that the problem is not solved by using a synthetic material instead of a glass reservoir.

The inventor has now found that this problem can be solved by providing the reservoir internally with a plurality of longitudinal ribs. The "sticking" of the capsule or capsules in the reservoir proves to be obviated substantially when such a reservoir is used. A further improvement can be achieved by giving the bottom of the reservoir a convex construction internally. The so-called "sticking", in which the capsule or capsules do not leave the reservoir when same is opened and inverted has been found to occur not at all any longer when a reservoir is used which internally has a number of longitudinal ribs and a convex bottom.

It is furthermore of the utmost importance that capsules comprising substances which are dangerous for the environment, in particular radioactive radiation-emitting compositions, remain inside the shielding sleeve as long as possible. It has so far been common practice, after opening the shielding sleeve, to take the reservoir out of the shielding sleeve and then to open it by unscrewing the cap.

It will be obvious that the patient's environment is exposed to the unprotected dangerous substance, in particular the radiation of a radioactive composition, for a comparatively long period of time.

- As another aspect of the present invention it was found that the said exposure time can be considerably reduced by ensuring that the bottom portion of the reservoir is externally non-rotationally symmetrical and is proportioned so that it fits within the shielding sleeve which has a bottom portion with a likewise non-rotationally symmetrical inner wall, preferably with an internal cross-section which is a triangular to dodecagonal or forms a segment of a circle, so that the reservoir is locked against rotation within the sleeve. As a result of this it has become possible, during the action of opening the reservoir, to leave the reservoir inside the shielding sleeve—which, of course, is open at the top—and during unscrewing take hold the cap of the reservoir with one hand and to hold the outside of the shielding sleeve with the other hand. In this manner, the patient's environment is exposed to the dangerous substance for an shorter period of time.

In a suitable embodiment, the externally non-rotationally symmetrical bottom portion of the reservoir is constructed so as to have a circumferential shape which is triangular to dodecagonal or corresponds to the segment of a circle. The circumferential shape may correspond to the internal cross-section of the bottom portion of the shielding sleeve, but this is not necessary. It is only of importance that the reservoir is locked against rotation inside the shielding sleeve during unscrewing the cap.

In another likewise particularly favourable embodiment the reservoir is manufactured from a suitable, non-deformable synthetic material. Synthetic materials, provided they are compatible with the dangerous substance to be swallowed and provided they are inert with respect to the capsule with the composition present therein, are to be preferred to glass, because the reservoirs manufactured from said synthetic materials cannot easily break. It frequently occurs, that the glass reservoir during transport or during the actions preceding the administration of the capsule or capsules breaks, as a result of which the capsule or capsules can no longer be swallowed or can be swallowed with great difficulty only. This disadvantage can be avoided by manufacturing the reservoir from a suitable synthetic material. Moreover, the radioactivity of a composition must always be measured before it is administered to a patient. This measurement can more safely be carried out when the composition is accommodated in a synthetic material reservoir, so without the danger of fracture. Synthetic material articles can easily be manufactured in the desired shape by injection-moulding. In the above preferred embodiment the bottom of the reservoir, which thus is manufactured from a suitable synthetic material, externally comprises a plurality of rib-like elements which fit within the bottom portion of the shielding sleeve and which extend perpendicularly to the bottom of the reservoir. It has been found that polyethylene terephthalate is an excellently suitable synthetic material for the reservoir when the reservoir serves for accommodating one or more capsules comprising radioactive composition, in particular a iodine-131-containing composition. This synthetic material unites in itself a number of favourable properties, for example, suitability to manufacture a reservoir from it, resistance to radioactive radiation and, when used for capsules comprising iodine-131-containing compositions, impermeability to iodine vapour.

It is advantageous to provide the above-mentioned synthetic material reservoir externally with a plurality of longitudinal ribs so that it can better withstand bending forces. In fact, when the reservoir is taken out of the shielding sleeve, lateral forces may be exerted on the said reservoir. In an embodiment which is favourable for production, the said longitudinal ribs provided on the outside of the reservoir are constructed so that at least a part thereof continues as the rib-like elements provided on the bottom.

In a further preferred embodiment the rib-like elements are provided on the bottom of the reservoir in such manner that the collective rib-like elements on the bottom of the reservoir show a cross-like or star-like cross-section and may be provided at the ends remote from the common axis with a plurality of breakable or bendable cam-like projections extending in the longitudinal direction of the reservoir.

It can easily occur when the cap is screwed on the reservoir that too large a force is exerted on the cap. The same thing occures when it is tried to rotate the cap in the reverse direction although the intention was to unscrew it. Because the reservoir with its bottom is preferably locked against rotation inside the shielding sleeve, the result may be a torsional force on the reservoir which may cause fracture of the reservoir; fracture frequently occurs in particular with glass reservoirs. The above-mentioned breakable or bendable cam-like projections present an excellent safety in such cases, because when too large torsional forces are exerted on the reservoir, said projections can break off or bend over, as a result of which the reservoir further remains intact.

The present invention also relates to a shielded holder for at least one capsule for oral administration, which comprises a substance which is dangerous for the environment in particular a radioactive composition, said holder comprising a reservoir and a shielding sleeve which is preferably manufactured from lead. The holder according to the invention comprises a reservoir as described hereinbefore, namely having an externally non-rotationally symmetrically bottom portion which is proportioned so that it fits within the shielding sleeve, the shielding sleeve having a bottom portion whose internal cross-section is triangular to dodecagonal or forms a segment of a circle, so that the reservoir is locked against rotation inside the sleeve.

In a preferred embodiment the preferably lead shielding sleeve of the above-mentioned holder according to the invention comprises two detachable portions within which the reservoir is enclosed, namely a lower retaining portion and an upper retaining portion, the lower retaining portion of the shielding sleeve internally comprising holding means for the reservoir so that after detaching the upper retaining portion the reservoir does not by itself drop out of the lower retaining portion when the said latter portion with the reservoir inside is held in the upside-down position. Various means are suitable to hold the reservoir inside the shielding sleeve, for example, a rubber ring which is connected in a circumferential groove in the inner wall of the lower retaining portion of the sleeve and which clamps the reservoir resiliently. The patient, after having removed the cap from the reservoir, can move the lower retaining portion with the reservoir inside in the upside down position to his mouth and swallow the capsule without the reservoir dropping out of the said retaining portion. In this manner the patient needs to perform fewer actions as a result of which the environment hence is exposed for a shorter period of time to the dangerous substance, while moreover he/she is better protected from the dangerous substance during swallowing the capsule, in particular from radioactive radiation thereof.

In a further preferred embodiment the upper retaining portion of the shielding sleeve of the holder according to the invention has a square to dodecagonal cross-section over at least a part of its internal length in which the cap likewise having a square to dodecagonal circumferential shape fits. Now it is not necessary for the patient to first remove the upper retaining portion of the shielding sleeve before the cap can be unscrewed from the reservoir, but the cap can simply be unscrewed by rotating the upper and lower retaining portions of the shielding sleeve with respect to each other. As a result of this the patient's environment is exposed to the dangerous substance for even a shorter period of time. The cap and/or the upper retaining portion are/is provided with holding means for the cap within the said retaining portion so that the cap after unscrewing can be taken off simultaneously with the upper retaining portion. Velcro connected on the outside of the cap and on the inner wall of the said retaining portion constitutes an excellent means to hold the cap in the upper retaining portion.

Figure 2:
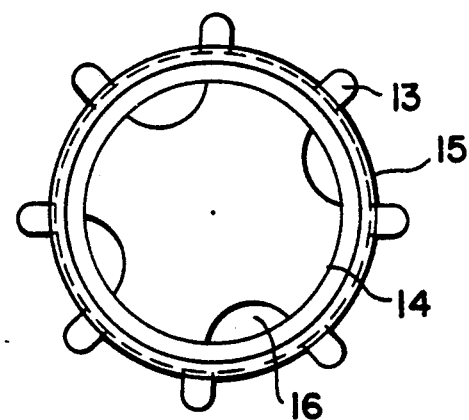
Figure 3:
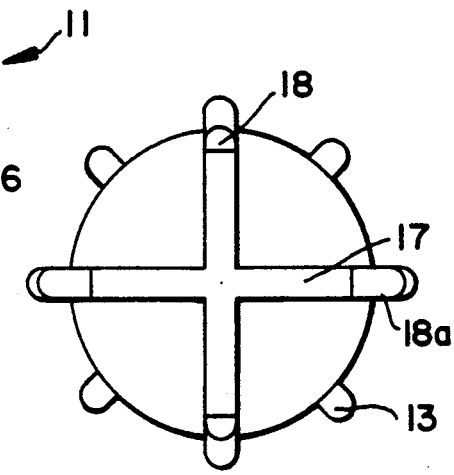
Figure 4:
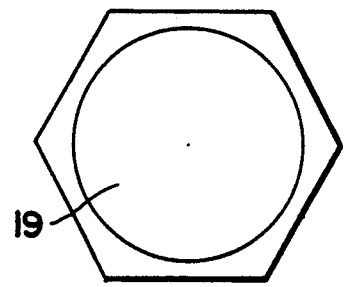
Figure 5:
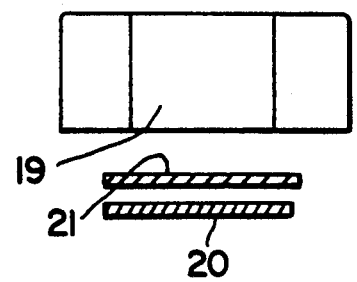
Figure 6:
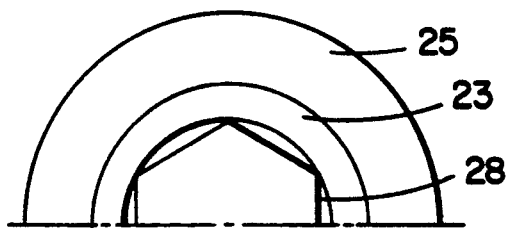
Figure 7:
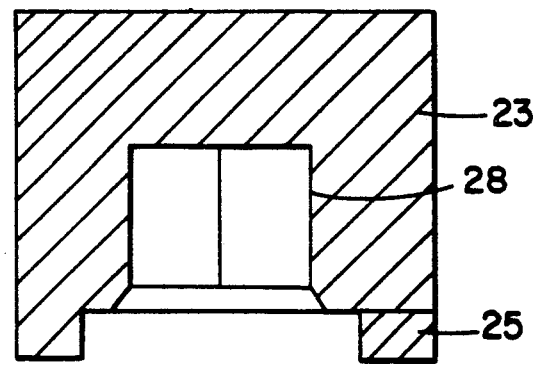
Figure 8:
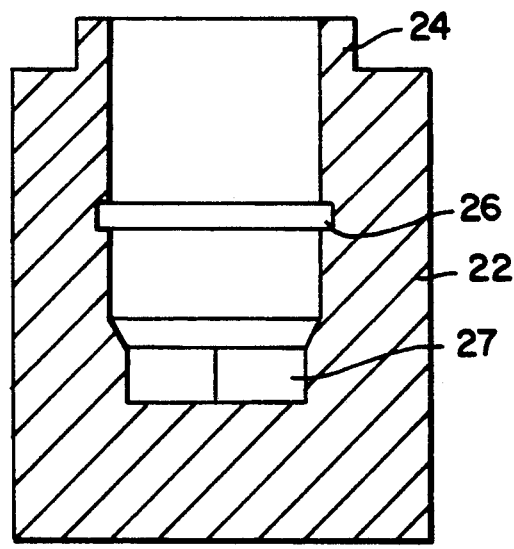
Figure 9:

The invention will now be described in greater detail with reference to the accompanying drawings, in which FIG. 1 is partly a longitudinal sectional view and partly a side elevation of a reservoir according to the invention;

FIGS. 2 and 3 are a plan view and a underneath view, respectively, of the same reservoir;

FIGS. 4 and 5 are a plan view and a side elevation, respectively, of a screw cap for the reservoir shown in FIGS. 1-3; and FIGS. 6-9 show a lead shielding sleeve for the reservoir, of which FIGS. 6 and 7 show the upper retaining portion, FIG. 7 as a cross-sectional view and FIG. 6 as a (partly) underneath view, and FIGS. 8 and 9 show the lower retaining portion, FIG. 8 as a cross-sectional view and FIG. 9 as a (partly) plan view.

The reservoir 11 shown in FIGS. 1-3 comprises an internally convex bottom 12, a sidewall 14 reinforced externally with longitudinal ribs 13, and an open upper end having screwthread 15 on which a screw cap as shown in FIGS. 4 and 5 can be screwed. The longitudinal inner ribs are referenced 16. As is shown clearest in FIG. 3, four of the eight external reinforcing ribs are elongated downwards and constitute there two crosswise placed rib-shaped elements 17 which extent perpendicularly to the bottom of the reservoir. Four cam-shaped projections 18 and 18a extend at their downward ends and serve as spacing supports so that the reservoir, if placed in a shielding sleeve, projects sufficiently from the lower retaining portion thereof. The cam-shaped projections 18a can be bent and fit exactly within the hexagonal bottom portion (27 in FIGS. 8 and 9) of the shielding sleeve. In this manner they lock the reservoir in the shielding sleeve against rotation and also serve as a safety when too large torsional forces are exerted on the reservoir. The reservoir is manufactured from polyethylene terephthalate.

The scew cap 19 shown in FIGS. 4 and 5 and manufactured from a suitable synthetic material e.g. polypropene, has an outer hexagonal shape and fits within the upper retaining portion of the lead shielding sleeve shown in FIGS. 6–9. For sealing purposes, the screw cap internally comprises an active carbon filter 21 and millipore paper filter 20 which are shown separately in FIG. 5.

The lead shielding sleeve shown in FIGS. 6–9 comprises a lower retaining portion 22 and an upper retaining portion 23, the upright edge 24 of the lower retaining portion fitting within the circumferential edge 25 of the upper retaining portion. A circumferential recess 26 in the lower retaining portion may comprise a rubber ring which can hold the reservoir in a resilient clamping within said retaining portion. The lower retaining portion furthermore has a bottom portion 27 having a hexagonal inner cross-section in which the cam-shaped projections 18a of the reservoir shown in FIGS. 1–3 fit exactly. As a result of this the reservoir is locked against rotation inside the said lower retaining portion. The upper retaining portion 23 also has a hexagonal inner cross-section 28 which corresponds to the circumferential shape of the screw cap shown in FIGS. 4–5. Velcro may be used as a holding means for the screw cap within the said upper retaining portion and is connected to the screw cap and to the inner wall of the said retaining portion.

I claim:

1. A shielded holder for holding at least one orally administered capsule which contains a substance dangerous to the environment; the holder comprising an internal reservoir in which the capsule is contained, the reservoir being shaped substantially in the form of a cylinder having a closed lower end, has means to facilitate closure by a cap at an open upper end, and includes a plurality of longitudinal ribs on the interior surface of the cylinder; and
   an internal shielding sleeve surrounding the reservoir.

2. A shielded holder according to claim 1, wherein a bottom portion of the reservoir has an external non-rotational symmetry proportioned to fit within a bottom portion of the shielding sleeve which has an internal non-rotational symmetry corresponding to the external non-rotational symmetry of the reservoir; thereby enabling the reservoir to be locked against rotation within the shielding sleeve.

3. A shielded holder according to claim 2, wherein the external non-rotational symmetry of the reservoir and the internal non-rotational symmetry of the shielding sleeve are triangular to dodecagonal or corresponds to a segment of a circle.

4. A shielded holder according to claim 1, wherein the reservoir further includes a plurality of external reinforcing longitudinal ribs, a portion of which continue as rib-shaped elements along the bottom of the reservoir and extend perpendicularly to the bottom of the reservoir.

5. A shielded holder according to claim 4, wherein the rib-shaped elements along the bottom of the reservoir fit within a bottom portion of the shielding sleeve and thereby enable the reservoir to be locked against rotation within the shielding sleeve.

6. A shielded holder according to claim 4, wherein the collective rib-shaped elements along the bottom of the reservoir show a cross-like or star-like cross-section and are provided with ends remote from a common axis with breakable or bendable cam-shaped projections extending in a longitudinal direction.

7. A shielded holder according to claim 1, wherein the shielding sleeve consists of two detachable portions; a lower detachable portion for retaining the reservoir and including holding means for the reservoir which prevents the reservoir from dropping out of the lower detachable portion when the lower detachable portion is held in an upside-down position; and an upper detachable portion for retaining the cap for the reservoir and having a square to dodecagonal internal cross-section which corresponds to the shape of the cap.

8. A shielded holder according to claim 7, wherein the holding means comprises a rubber ring.

9. A shielded holder according to claim 7, wherein the upper detachable portion includes retaining means for retaining the cap within the upper detachable portion.

10. A shielded holder according to claim 8, wherein the retaining means comprises velcro.

11. A shielded holder according to claim 1, wherein the shielding sleeve is a lead sleeve.

* * * * *